Patented Jan. 19, 1937

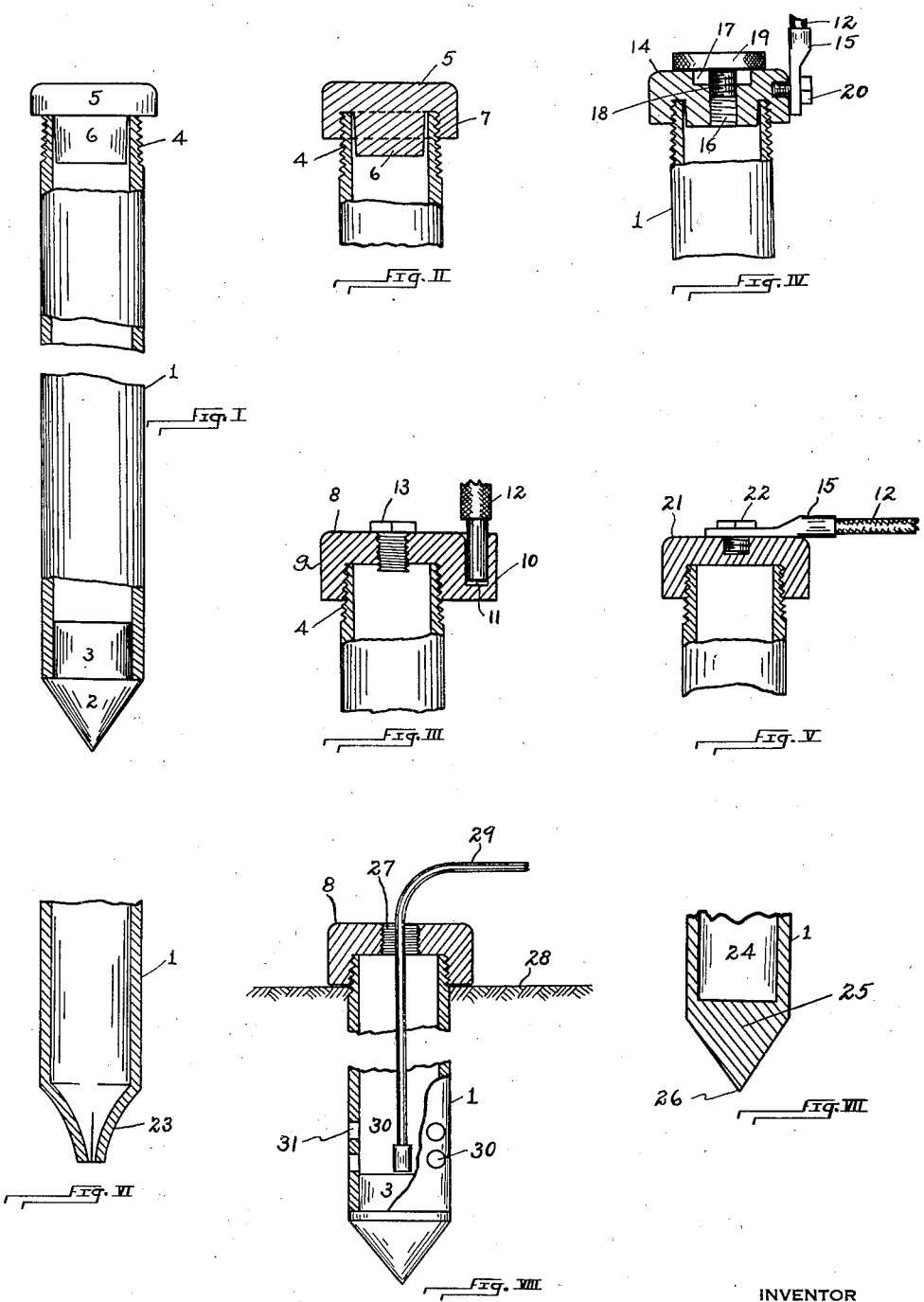

2,068,545

UNITED STATES PATENT OFFICE 2,068,545

GROUNDING MEANS

William Alexander Haig, Milwaukee, Wis., assignor to National Electric Products Corporation, a corporation of Delaware Application May 20, 1935, Serial No. 22,317

1 Claim. (Cl. 173—31)

This invention relates to ground rods which are to be driven into the earth for the purpose of grounding the whole or a portion of electrical circuits and equipment.

In making a wholly satisfactory ground connection in the earth, or ground, by means of grounding rods, it is necessary that such rods be of adequately conductive material, and that they are driven deeply enough into the earth to reach permanently moist soil. It is also necessary that close and adequate contact be established between the grounding rod and the circuit or equipment which is to be grounded. Considerable difficulty is frequently met in driving ground rods, whether they be solid or tubular, into the earth to a depth sufficient to reach the permanently moist soil in which a satisfactory grounding may be made. It thus happens frequently that workmen whose duty it is to install ground connections actually drive into the earth for grounding a rod which is of length inadequate for perfect grounding in the locality of its insertion. After a grounding rod has been driven, it is impossible to ascertain by a mere inspection of the protruding portion of the rod, to which electrical connection is made, whether or not the rod extends into the earth the prescribed distance to reach moist soil, and establish a ground of the desired efficiency therewith.

It occasionally happens that, because of extraordinarily dry atmospheric conditions, the soil penetrated by the grounding rod becomes deficient in moisture adequate to effect a perfect grounding, or because of certain conditions existing, or likely to exist, in the electrical circuit or equipment which is grounded, additional moisture, or a solution having conductive properties, is desirably introduced into the underlying region of the earth which is penetrated by the grounding rod. Under such circumstances it is difficult to so apply moisture to the surface of the earth at the point of insertion of the grounding rod that the added water seeps sufficiently far into the soil to adequately moisten the soil surrounding the lower region of the grounding rod. Pouring a conductive solution on the surface surrounding the grounding rod is incapable of effecting the desired improvement in the grounding, since not only is it uncertain that the liquid will seep to a depth at which it will permanently remain, but also during percolation of the solution into the soil, there is a tendency for the dissolved, conductive material to be leached from the solution.

One object of my invention is, therefore, to provide a grounding rod, hollow throughout a predetermined length, in which the hollow interior of the rod is protected against the intrusion of foreign matter tending partially to fill the same, by closure means which permit the insertion of measuring instruments for gauging the length of the cavity within the rod, and thereby gauging the depth to which the rod penetrates the earth.

Another object of my invention is to provide means for so protecting the tubular, upper terminal of a hollow grounding rod against the distorting effect of driving blows struck upon it that the closure element may be adequately fitted to the hollow upper terminal of the rod.

More particularly, an object of my invention is to associate with the closure element of the hollow rod, a conductor terminal, and to so protect the upper, tubular region of the rod during driving that an electrical contact of good conductivity between the body of the grounding rod and the conductor is made through the closure element which is applied to the upper terminal of the grounding rod, and to which the conductor is terminally connected.

A still further object of my invention is to perforate a hollow grounding rod in its lower region, so that liquids may be introduced through the grounding rod into an underlying region of the soil adjacent the lower extremity of the grounding rod, the hollow interior of the rod being protected by a removable closure from the intrusion of foreign matter which might seal the ports through the wall of the grounding rod by way of which liquid is delivered into the soil.

In the accompanying drawing Fig. I is a view, partly in elevation and partly in central, vertical section, showing one form of my hollow grounding rod, with means applied to the rod for protecting its upper terminal from the distorting effect of blows for driving the rod into the earth.

Fig. II is a fragmentary view, partly in elevation and partly in central, vertical section, showing the upper region of my grounding rod with protecting means of more specialized form applied terminally to the grounding rod.

Fig. III is a fragmentary view, partly in elevation and partly in central, vertical section, showing a combined closure and electrical connecting element applied to the upper terminal of the grounding rod; said closure being so constructed that access to the interior of the grounding rod may be had without removing the closure as a whole from mounted position.

Fig. IV is a view similar to Fig. III, but showing a modified form of closure and connecting element, arranged to permit driving of the grounding rod, utilizing the closure element itself as a protecting element for the upper terminal of the rod.

Fig. V is a view similar to Figs. III and IV, and showing a closure and connecting element generally similar to those shown in Figs. III and IV, the closure and connecting element of this figure of the drawing, however, being of simplified form.

Fig. VI is a fragmentary view, taken in central, vertical section, showing the lower region of the grounding rod, and illustrating a modified pointing of the rod.

Fig. VII is a similar view illustrating a still further modification in the structure of the grounding rod at its lower, or ground penetrating, extremity.

Fig. VIII is a view of the grounding rod, taken partly in elevation and partly in central, vertical section, showing the grounding rod perforated in its lower region for the egress of liquid therefrom, and illustrating the estimation of the depth to which the grounding rod penetrates by insertion of a sound into the hollow interior of the grounding rod.

Referring initially to Fig. I of the drawing, the grounding rod is shown as comprising a main body portion 1 of tubular form. At its lower, or penetrating, extremity, the rod is provided with an element to facilitate driving it into the earth. The penetrating element comprises a conical, outer portion 2, which is brought to a relatively sharp point, and an upper, cylindrical portion 3, which is of a diameter less than that of the base of the conical portion 2, and which is adapted to have a close fit in the tubular body 1 when forced thereinto. The upper region of tubular body 1 is exteriorly threaded, as at 4, the purpose of the threading, as will hereinafter appear, being to provide close mounting of a closure and electrical connecting element at the upper terminal of the grounding rod.

There is also shown in Fig. I of the drawing, an element for protecting the upper terminal of the grounding rod from the deforming effect of driving blows. This element comprises a cap portion 5, which is of a diameter greater than that of the tubular body, and which is adapted to rest upon the terminal edge of the tubular body. Depending from the cap portion 5 is a positioning stem 6, which is of a diameter to enter the bore of the tubular body 1.

The protecting element shown in Fig. II is similar to that shown in Fig. I, but comprises additionally an annular skirt 7 depending from the cap portion 5 of the protecting element, and which is interiorly threaded to engage the threaded region 4 on the tubular body 1 of the mounting rod. The advantage of this specialized form of protecting element is that the threaded skirt 7 more accurately positions the element on the tubular body of the grounding rod, and more certainly protects the threads on the grounding rod from being battered during the operation of driving the rod.

Assuming that there is to be applied at the upper terminal of the grounding rod a closure element such as that shown in Fig. III, which is not constructed to withstand driving blows delivered at the upper terminal of the grounding rod, a protecting element, or cap, such as the element shown in Fig. I, or the protecting element, or cap, shown in Fig. II, is applied at the upper terminal of the rod. After the grounding rod has been driven the required distance into the earth, the protecting element, or cap, is removed, and a closure and electrical connecting element is applied at the upper terminal of the grounding rod. This may be any one of the closure elements as shown in Figs. III, IV, and V, but the structure of the closure element shown in Fig. III will be first described.

The closure element 8 shown in Fig. III is in the general form of a gland, having an interiorly threaded annular skirt 9 depending from the upper, or cap, portion 8 of the closure, and adapted to engage the threaded terminal region 4 of the grounding rod. With this closure cap applied to the grounding rod, electrical connection to the circuit, or equipment, to be grounded may be made at a boss 10, which is secured peripherally to the closure cap, and which has therein a recess 11 to receive and secure the bared terminal of an electrical conducting wire 12. It will be noted that, as mounted on the grounding rod, and as electrically connected, the closure cap provides a connection of good electrical conductivity between conducting wire 12 and the body of the grounding rod.

Access may be had to the interior of the grounding rod body by way of a threaded opening through the cap portion of the closure element, which opening is normally closed by a closure screw 13.

Referring to Fig. IV of the drawing, the closure element 14, there shown as screwed onto the upper threaded region of the tubular body 1, is generally similar in form to the closure cap shown in Fig. II. This cap 14 similarly has therethrough a threaded bore, designated by reference numeral 16. The upper face of the closure cap is, however, counterbored to provide a recess 17 of restricted area. Closure screw 18 has thereon a head 19 of greater lateral spread than the recess 17, so that it may be positioned by contact with the upper face of the cap. In driving the grounding rod, with the closure cap 14 serving as a protecting element, closure screw 18 is removed. During driving, the threaded bore 16 being inset below the striking face of the closure cap, there is but little danger that the relatively delicate threading in the bore may be battered by the driving blows.

In order that the electrical connection to the closure cap 14 may not be damaged in driving the grounding rod, the connecting means are made wholly removable. As shown, connecting means adapted for this purpose comprise a set-screw 20, which is adapted to enter a threaded bore extending longitudinally from the peripheral surface of the cap. Set-screw 20 is adapted, therefore, to closely engage to the peripheral surface of the cap a terminal connecter 15 carried by a conducting wire 12.

The simplified form of closure and electrical connecting element shown in Fig. V of the drawing, comprises a closure cap 21 generally similar in form to the closure cap 8 shown in Fig. III. This closure cap 21, however, has in its upper, or cap, region a threaded screw hole which does not extend completely through the cap to give access to the interior of the grounding rod. Electrical connection is made at the upper face of the closure cap by means of a set-screw 22, which is adapted to engage the terminal connecter 15 on conducting wire 12 closely to the upper surface of the cap. It would be desirable that a piece of wood, or the like, be placed upon the closure cap to take directly the blows of a hammer, if this form of closure cap be used as a driving cap also. This is for the reason that the threads in the screw hole for binding screw 22 are not protected from injury, as by a countersunk positioning such as that shown in Fig. IV. Also it is necessary that the closure element as a whole be removed in order that access may be had to the interior of the grounding rod. The merit of this form of closure and connecting element resides in its simplicity.

Modified pointing of the tubular body 1 of the grounding rod is shown in Fig. VI and VII. In Fig. VI the grounding rod is pointed by hammering the lower region of the rod wall inwardly, so that a terminal region 23 tapering to an approximate point is formed. This mode of pointing possesses the merit of simplicity, but is somewhat less desirable in practice than the forms of pointing shown in Figs. I and VII. In Fig. VII the grounding rod has therein a bored cavity 24, which is discontinued to leave a solid region 25 for the penetrating terminal of the grounding rod. This solid region 25 may be brought, as shown, to a penetrating point 26.

The capabilities of my grounding rod are illustrated by Fig. VIII of the drawing. In that figure of the drawing, the penetrating terminal of the grounding rod is shown as formed in accordance with the pointing element of Fig. I, and a closure element, such as that of Fig. III, is shown mounted at the upper terminal of the rod. In this figure of the drawing, closure screw 13 has been removed to leave open a bore 27 through the cap portion of the closure element, thus providing access to the interior of the grounding rod. In order to estimate the distance of penetration below ground level 28, a sound, comprising a flexible member 29, and a terminal weight 30, has been introduced into the hollow interior of the grounding rod, and allowed to come to rest upon the upward extension 3 of the pointing element. The proper dimensions of the grounding rod having been predetermined, it is a simple matter in each instance thus to determine if the particular grounding rod inspected is of a full prescribed length so that it has been caused to penetrate an adequate distance into the earth.

Fig. VIII also shows a plurality of ports 31 through the wall of the tubular body 1, in the lower region of the grounding rod. Access to the interior of the grounding rod having been established, water, or a suitable conductive solution, may be introduced into the grounding rod, to pass outwardly through the ports 31 for saturating the surrounding soil. These ports 31 are maintained open because of the closure element of the assembly, which protects the interior of the ground rod against the entry of foreign matter, and thus prevents clogging of the ports.

It will be noted that the ports 31 provide means for moistening the soil adjacent the lowest driven extremity of the grounding rod, thus providing moisture in the region in which its effect in increasing grounding conductivity is greatest. Also in supplying water, or a conductive solution, the entire hollow region of the grounding rod acts as a containing vessel, which may be wholly filled with water, or solution, and from which the liquid may gradually percolate into the soil.

I claim as my invention:

In a grounding rod for the grounding of electrical circuits and equipment the combination of an elongate metallic tube of circular section having a pointed ground-penetrating terminal and forming interiorly a sound-receiving bore, with a metallic body forming a driving and closure cap for the tube having at the under side thereof an annular upwardly extended groove threaded to the exterior of the tube at its upper terminal, said cap being arranged for the attachment of electrical terminal connection thereto and having a threaded bore providing passage for a depth-measuring sound extended therethrough and terminating upwardly in a recess formed below the upper face of the cap by which the bore threads are protectively shielded from the battering effect of blows delivered on the upper face of the cap, and a closure screw adapted to enter and close said threaded bore.

WILLIAM ALEXANDER HAIG.